United States Patent Office
3,127,433
Patented Mar. 31, 1964

3,127,433
1,1-BIS(TRIFLUOROMETHYL) ETHYL SILANES AND SILOXANES
Paul Tarrant, Gainesville, Fla., assignor, by mesne assignments, to Dow Corning Corporation, Midland, Mich., a corporation of Michigan
No Drawing. Filed July 16, 1958, Ser. No. 748,824
9 Claims. (Cl. 260—448.2)

This invention relates to organosilicon compounds which contain hexafluoroisobutyl substituents on the silicon atoms.

It is an object of this invention to prepare novel organosilicon compounds which are useful as lubricants, water repellent agents, and dielectric fluids. It is a further object to prepare compounds which are useful in the preparation of organosiloxane resins and rubbers having increased solvent resistance.

The compounds of this invention can be monomeric or polymeric in form. The monomeric silanes have the formula $[(CF_3)_2CHCH_2]R_ySiY_{3-y}$ where R is a monovalent hydrocarbon radical free of aliphatic unsaturation, Y is selected from the group consisting of Cl and Br atoms and radicals of the formula OR' where R' is selected from the group consisting of alkyl and aryl radicals, and y is an integer of from 0 to 3 inclusive.

The polymers of this invention are those organosiloxanes which can be prepared by the hydrolysis and condensation of those of the above-described monomeric compounds which contain from 1 to 3 inclusive Y radicals, or by the cohydrolysis and cocondensation of such compounds with conventional hydrolyzable organosilanes. Thus, the polymers include those organosiloxanes which consist essentially of polymeric units of the formula

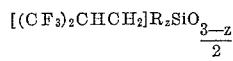

where R is as above defined and z is from 0 to 2 inclusive, and copolymers which contain the above-defined polymeric units along with units of the formula

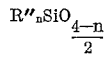

where n is an integer of from 1 to 3 inclusive and R'' is a monovalent hydrocarbon radical or a brominated or chlorinated derivative thereof. Preferably such copolymers contain at least 0.1 molar percent of the former units. The R and R'' radicals can of course be all the same or all different radicals.

The monomers of this invention are best prepared by reacting the olefin of the formula $CH_2=C(CF_3)_2$ with a silane of the formula $R_yHSiX_{3-y}$ where X is Cl or Br and y is as above defined. This reaction produces those compounds in which Y is Cl or Br, and is best carried out at a temperature of from 150 to 300° C. The reaction proceeds in the absence of a catalyst, but preferably is carried out in the presence of a catalyst such as chloroplatinic acid or platinum dispersed on charcoal. Those compounds in which Y is an OR' group can be prepared by reacting the chloro- or bromosilane products from the above reaction with the appropriate sodium alcoholate.

For the purpose of this invention, R can be any monovalent hydrocarbon radical free of aliphatic unsaturation. Suitable examples include alkyl radicals such as methyl, ethyl, isopropyl, and octadecyl; aryl radicals such as phenyl, xenyl, and naphthyl; alkaryl radicals such as tolyl and xylyl; aralkyl radicals such as benzyl; and cycloaliphatic radicals such as cyclohexyl. Thus, specific examples of silanes which can be used in the above-described reaction include any of the compounds $RHSiCl_2$, $RHSiBr_2$, $R_2HSiCl$, $RH_2SiCl$, and $R_3SiH$, where each R is any of the above-mentioned radicals, as well as the inorganic silanes such as $HSiCl_3$ and $HSiBr_3$.

An alternative method for introducing R groups is to react a Grignard reagent (such as RMgCl) with the adduct formed from the reaction of the olefin with $HSiCl_3$, $RHSiCl_2$, or $R_2HSiCl$.

In the preparation of those compounds in which Y is the OR' group, any sodium alcoholate, phenolate, or substituted phenolate can be used, although it is preferred that it contain no more than 10 carbon atoms. Preferred examples include sodium methylate, ethylate, and phenolate. The reaction takes place by merely contacting the alcoholate with the halosilane in a liquid phase. If desired, the alcoholate can be used as a solution in the alcohol from which it was formed.

In the preparation of the organosiloxanes of this invention, any of the above-described compounds which contain at least 1 Y radical can be hydrolyzed or cohydrolyzed by the conventional and well-known techniques for the hydrolysis of organosilanes. If desired, the hydrolysis can be carried out in the presence of solvents such as ether, toluene, xylene, or other hydrocarbons.

Copolymers can be prepared by cohydrolyzing two or more of the defined hexafluoroisobutyl substituted silanes, or by the cohydrolysis of one or more of such silanes with conventional organosilanes of the formula $R''_nSiCl_{4-n}$ where R'' and n are as above defined. Suitable R'' radicals include all of the radicals described above as exemplary of the R radicals, as well as radicals containing aliphatic unsaturation such as vinyl, allyl and propargyl radicals, and unsaturated cycloaliphatic radicals such as cyclohexenyl. The R'' radicals can also be the chlorinated or bromated derivatives of any of the above-described radicals, preferably the chlorinated or brominated aryl radicals such as chlorophenyl, dichlorophenyl, bromophenyl, and dibromophenyl radicals.

The polymers and copolymers can of course contain small amounts of uncondensed silicon-bonded OH groups and/or unhydrolyzed Y radicals, as is conventional in silicone polymers.

The olefin which is employed in the preparation of the monomers of this invention is a known compound. It can be prepared, for example, by the steps shown in the following equations. The symbols Me, Et and Ph will be used here and throughout this specification as representative of methyl, ethyl and phenyl radicals respectively.

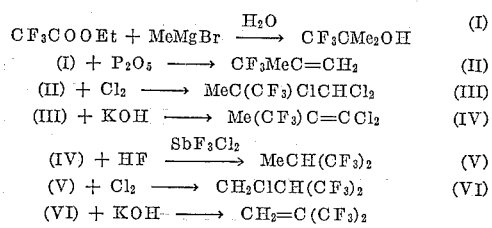

Each of the reactions set forth in the above steps is conventional in the preparation of various olefins.

The monomeric silanes of this invention which contain Y radicals are useful in rendering materials water repellent, e.g. in the treatment of ceramic, masonry, and textile materials. Those monomers which contain no Y radicals are useful as hydraulic fluids and lubricants or as additives to conventional organosiloxanes which are to be used as hydraulic fluids or lubricants. The organosiloxanes of this invention are useful as lubricants and resins, and in the preparation of silicone rubbers. The preparation of rubbery materials from the high polymers within the scope of this invention can be accomplished by the conventional and well-known techniques, e.g. by the addition of fillers such as silica, followed by vulcanization of the compounded mass in the presence of any of the well-known vulcanization agents for silicone rubbers.

The following examples are illustrative only. All parts are parts by weight unless otherwise specified.

Example 1

17 parts of $(CF_3)_2C\!=\!CH_2$, 37 parts of $MeHSiCl_2$, and 0.1 part of a catalyst consisting of 5% by weight platinum deposited on charcoal were charged into an autoclave and agitated for 24 hours at 225° C. The autoclave was cooled and the contents were distilled, yielding the product $(CF_3)_2CHCH_2SiMeCl_2$, B.P. 125–126° C. at 760 mm. Hg.

Example 2

When the product of Example 1 is mixed with an equal weight of toluene and added to an excess of water, then the hydrolyzate heated at reflux, washed free of acid, and distilled free of toluene, the resulting oily polymer contains the cyclic trimer $[(CF_3)_2CHCH_2MeSiO]_3$, the cyclic tetramer $[(CF_3)_2CHCH_2MeSiO]_4$, and higher linear and cyclic polymers of the same unit formula.

Example 3

When $CH_2\!=\!C(CF_3)_2$ is reacted in the manner of Example 1 with the silanes listed below, the corresponding reaction products listed below are obtained.

| Silane: | Product |
|---|---|
| $Me_2HSiCl$ | $(CF_3)_2CHCH_2SiMe_2Cl$. |
| $MeEtHSiCl$ | $(CF_3)_2CHCH_2SiMeEtCl$. |
| $PhHSiCl_2$ | $(CF_3)_2CHCH_2SiPhCl_2$. |
| $HSiCl_3$ | $(CF_3)_2CHCH_2SiCl_3$. |
| $MeHSiBr_2$ | $(CF_3)_2CHCH_2SiMeBr_2$. |
| $H_2SiCl_2$ | $[(CF_3)_2CHCH_2]_2SiCl_2$. |

Example 4

When $(CF_3)_2CHCH_2SiMe_2Cl$ is reacted with an equimolar amount of $PhMgCl$ in diethylether, $$(CF_3)_2CHCH_2SiMe_2Ph$$

is obtained.

Example 5

When an equimolar mixture of $(CF_3)_2CHCH_2SiCl_3$, $MeSiCl_3$, $PhSiCl_3$, and $PhMeSiCl_2$ is mixed with an equal weight of toluene, hydrolyzed by adding the solution to an excess of water, then the hydrolyzate refluxed and washed free of acid, a resinous copolymer is obtained consisting essentially of units of the formula $$(CF_3)_2CHCH_2SiO_{1.5}, MeSiO_{1.5},$$

$PhSiO_{1.5}$, and $PhMeSiO$.

Example 6

When one mole of $(CF_3)_2CHCH_2SiMeCl_2$ is mixed with two mols of sodium ethylate or sodium phenolate, the compounds $(CF_3)_2CHCH_2SiMe(OEt)_2$ or $$(CF_3)_2CHCH_2SiMe(OPh)_2$$

are respectively obtained.

Example 7

When $(CF_3)_2CHCH_2SiMe_2Cl$ is hydrolyzed and the hydrolyzate condensed as in Example 2, the disiloxane $[(CF_3)_2CHCH_2Me_2Si]_2O$ is obtained. Cohydrolysis of the above silane with $Me_2SiCl_2$ in the same manner produces endblock polymers of the general formula $$QO(Me_2SiO)_mQ$$

(as well as the above disiloxane and homopolymers of $Me_2SiO$ units) where Q is the $(CF_3)_2CHCH_2Me_2Si$- group. Likewise, when $(CF_3)_2CHCH_2SiMeCl_2$ is cohydrolyzed with $Me_2SiCl_2$, copolymers of $Me_2SiO$ and $$(CF_3)_2CHCH_2MeSiO$$

units are produced.

That which is claimed is:

1. A compound of the formula $$[(CF_3)_2CHCH_2]R_ySiY_{3-y}$$

where R is a monovalent hydrocarbon radical free of aliphatic unsaturation, Y is selected from the group consisting of Cl and Br atoms and radicals of the formula OR' where R' is selected from the group consisting of alkyl and aryl radicals, and y is an integer of from 0 to 3 inclusive.

2. A compound of the formula $$(CF_3)_2CHCH_2Si(CH_3)Cl_2$$

3. A compound of the formula $(CF_3)_2CHCH_2SiCl_3$.
4. A compound of the formula $$(CF_3)_2CHCH_2Si(CH_3)_2Cl$$

5. An organosiloxane consisting essentially of polymeric units of the formula $$[(CF_3)_2CHCH_2]R_zSiO_{\frac{3-z}{2}}$$

where R is a monovalent hydrocarbon radical free of aliphatic unsaturation, and z is an integer of from 0 to 2 inclusive.

6. An organosiloxane consisting essentially of polymeric units of the formula $(CF_3)_2CHCH_2(CH_3)SiO$.

7. An organosiloxane having the formula $$[(CF_3)_2CHCH_2(CH_3)SiO]_3$$

8. An organosiloxane having the formula $$[(CF_3)_2CHCH_2(CH_3)SiO]_4$$

9. An organosiloxane copolymer in which at least 0.1 mol percent of the polymeric units are of the formula $$[(CF_3)_2CHCH_2]R_zSiO_{\frac{3-z}{2}}$$

where R is a monovalent hydrocarbon radical free of aliphatic unsaturation, and z is an integer of from 0 to 2 inclusive, the remaining polymeric units consisting essentially of units of the formula $$R''_nSiO_{\frac{4-n}{2}}$$

where n is an integer of from 1 to 3 inclusive and R'' is selected from the group consisting of monovalent hydrocarbon radicals and chlorinated and brominated derivatives thereof.

References Cited in the file of this patent

UNITED STATES PATENTS 2,894,969    Pierce   ---------------- July 14, 1959
2,934,515    Konkle et al.   ---------- Apr. 26, 1960

OTHER REFERENCES

Clark: WADC Technical Report 54–213, July 1954, AD No. 47085 ASTIA, Document Serv. Center, Knott Bldg., Dayton 2, Ohio.

Tarrant: WADC Tech. Report 55–220, August 1955, pp. iv, v, vi, 38 and 39, AD No. 93332, ASTIA, Document Serv. Center, Knott Bldg., Dayton 2, Ohio.

Tarrant et al.: WADC Tech. Report 55–220, Part 2, pp. iv, v and 18, May 1956, AD No. 100692, ASTIA, Document Serv. Center, Knott Bldg., Dayton 2, Ohio.

Haszeldine: Journal of the Chem. Soc. (London), 1953, pages 3565–3572.

McBee et al.: Journal Am. Chem. Soc., vol. 79, pp. 2329–32, May 1957.